No. 890,354. PATENTED JUNE 9, 1908.
A. A. GIARD.
MILK PAIL HOLDER.
APPLICATION FILED NOV. 13, 1907.

Witnesses

Inventor
A. A. Giard.
By
Attorneys

UNITED STATES PATENT OFFICE.

ANTOINE A. GIARD, OF BIG FALLS, MINNESOTA.

MILK-PAIL HOLDER.

No. 890,354.  Specification of Letters Patent.  Patented June 9, 1908.

Application filed November 13, 1907. Serial No. 402,020.

*To all whom it may concern:*

Be it known that I, ANTOINE A. GIARD, a citizen of the United States, residing at Big Falls, in the county of Koochiching and State of Minnesota, have invented certain new and useful Improvements in Milk-Pail Holders, of which the following is a specification.

It is well known that in the operation of milking it is a common practice to hold the milk pail between the knees and keep it in position by squeezing the pail or pressing the knees toward each other, this being manifestly a tiresome practice.

The object of this invention is an improved milk pail holder which may be easily attached to a pail and which obviates the necessity of squeezing the pail with the knees to hold it in the proper position.

With this and other objects in view as will more fully appear as the description proceeds, the invention consists in certain constructions and arrangements of parts that I shall hereinafter fully describe and claim.

Figure 1:
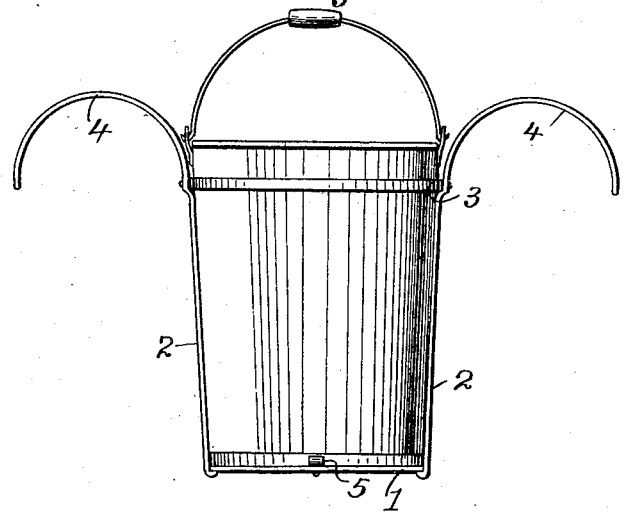
Figure 2:
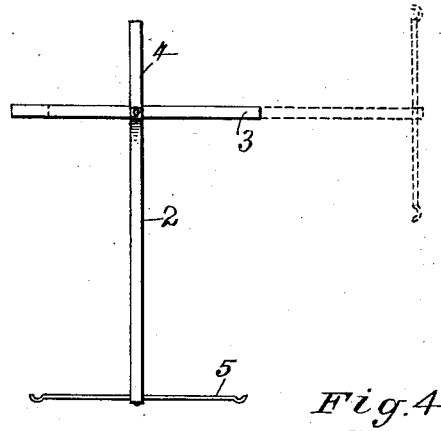
Figure 3:
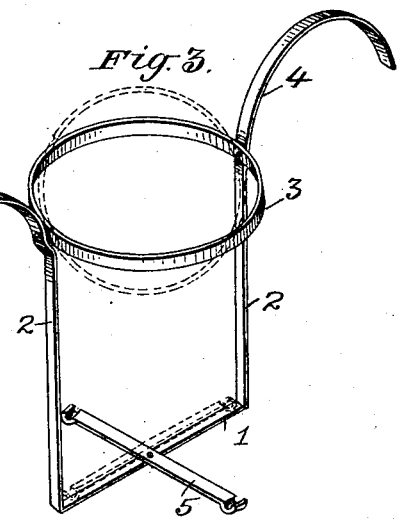
Figure 4:
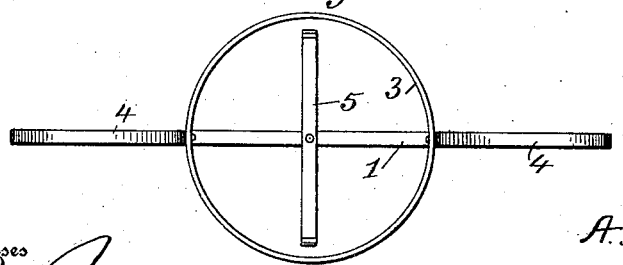

For a full understanding of the invention and the merits thereof, reference is to be had to the following description and accompanying drawings, in which:

Figure 1 is a side elevation of my improved milk pail holder showing it attached to a milk pail. Fig. 2 is a similar view of the device detached. Fig. 3 is a perspective view thereof indicating in dotted lines the folded position of the hoop and bar, and Fig. 4 is a top plan view thereof.

Corresponding and like parts are referred to in the following description and indicated in all the views of the drawings by the same reference characters.

My improved milk pail holder comprises a cross bar 1 and two side bars 2 secured at one end to the respective ends of the cross bar. A ring or hoop 3 is pivoted at diametrically opposite points to the side bars 2, near the other ends thereof. This hoop is adapted to be rotated to lie in a plane substantially perpendicular to the plane of the side bars or in a plane coincident therewith. To the last-named ends of the side bars 2 curved arms 4 are secured, said arms extending outwardly in opposite directions as shown. A bar 5 is pivoted at a point intermediate of its ends to the cross bar 1 and may be turned about the said point to lie perpendicular to the cross bar or coincident therewith.

To put the holder in position for use, the hoop 3 is rotated to lie in a plane perpendicular to the plane of the side bars 2 and the bar 5 is turned so as to lie perpendicular to the cross bar 1.

In the practical use of my improved milk pail holder, a pail is inserted in the hoop 3 with the bottom of the pail resting on the cross bar 1 and its attached bar 5. The arms 4 are placed over the knees of the user and support the pail in the desired position without the necessity of squeezing the said pail.

The holder may be readily folded when not in use by rotating the hoop 3 to lie in the same plane with the side bars 2 and by turning the bar 5 upon its pivot until it is coincident with the cross bar 1, thus bringing the several parts of the device in the same plane and permitting it to be put away conveniently until again desired for use.

It is to be understood that if desired, I may construct the cross bar, the said bars and the arms of an integral strip.

Having thus described the invention, what I claim is:

1. The herein-described milk pail holder comprising a cross bar, side bars secured to the cross bar and provided with outwardly extending arms, a hoop secured to the side bars, and a bar pivoted to the cross bar as and for the purpose set forth.

2. The herein-described milk pail holder comprising a cross-bar, side bars secured to the cross bar and provided with outwardly extending arms, a hoop pivotally secured to the side bars, and a bar pivoted to the cross-bar, as and for the purpose set forth.

In testimony whereof I affix my signature in presence of two witnesses.

ANTOINE A. GIARD. [L. S.]

Witnesses:
OLOF EASTLUND,
HENRY MILLS.